Nov. 28, 1967  F. A. SKANES ETAL  3,355,224
ENDLESS TRACK DRIVE SHOE
Filed Jan. 28, 1965  2 Sheets-Sheet 1
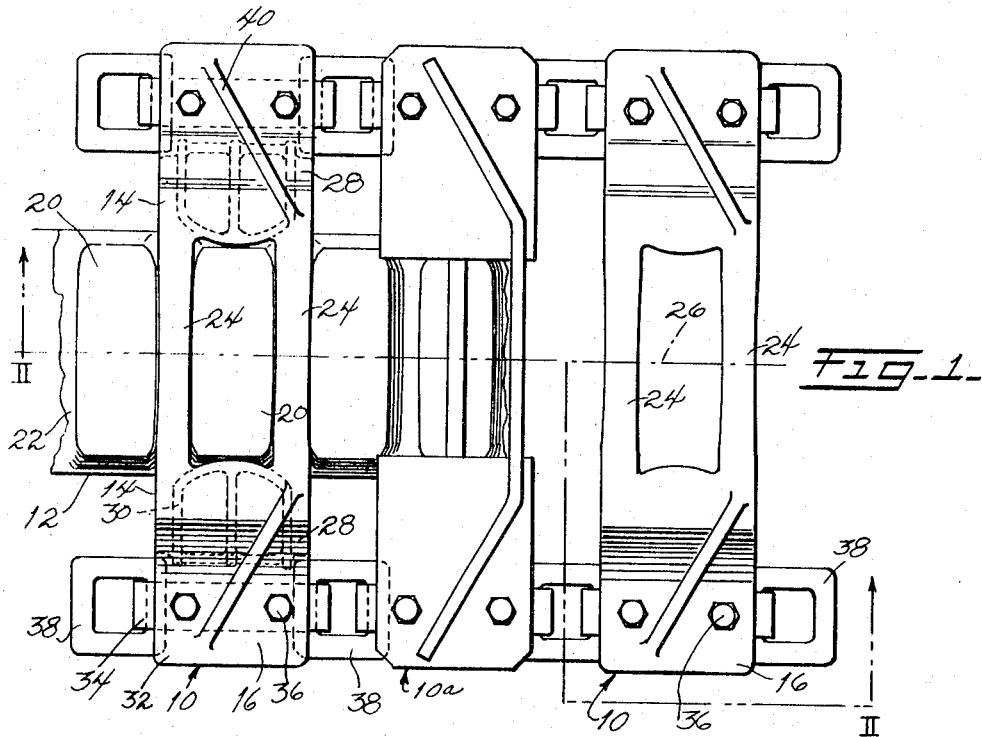
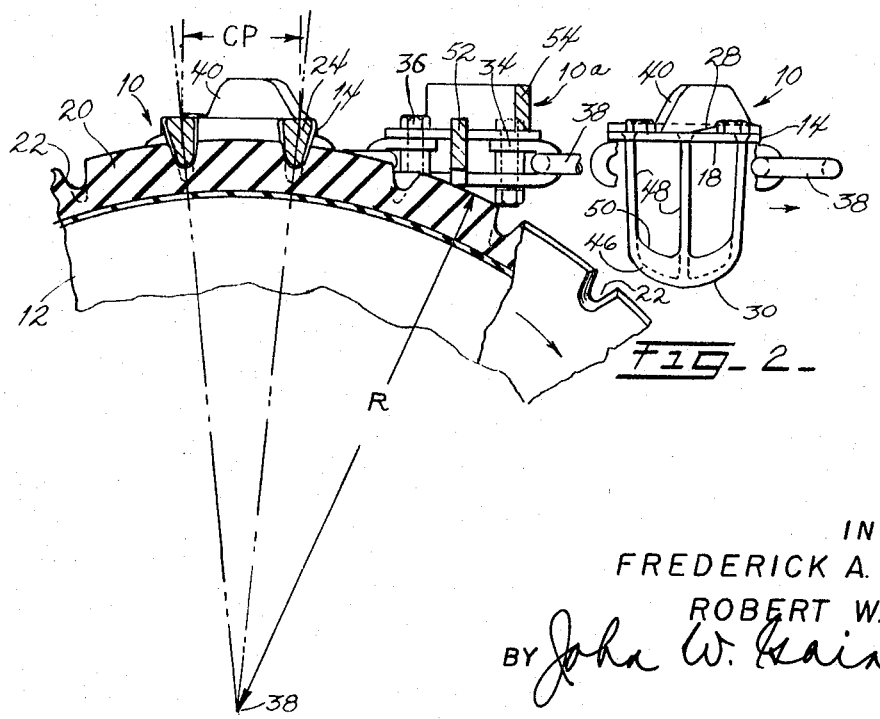
INVENTORS
FREDERICK A. SKANES
ROBERT W. LOGUE
BY John W. Haines
ATT'Y Nov. 28, 1967   F. A. SKANES ET AL   3,355,224
ENDLESS TRACK DRIVE SHOE
Filed Jan. 28, 1965   2 Sheets-Sheet 2

INVENTORS
FREDERICK A. SKANES
ROBERT W. LOGUE
BY John W. Gaines
ATT'Y

United States Patent Office 3,355,224
Patented Nov. 28, 1967

3,355,224
ENDLESS TRACK DRIVE SHOE
Frederick A. Skanes, Burlington, Ontario, and Robert W. Logue, Hamilton, Ontario, Canada, assignors to International Harvester Company, Chicago, Ill., a corporation of Delaware
Filed Jan. 28, 1965, Ser. No. 428,790
12 Claims. (Cl. 305—53)

This application relates to crawler vehicles, and particularly to the mating shoe and tire of an endless track drive for such vehicles. Crawler vehicles for logging and other uses in wooded terrain are sometimes termed skidders, and the track shoe of our invention is especially applicable to skidders of a type equipped with rubber lugged, pneumatic drive tires.

Skidder track shoes, according to one general practice in the past, have been put together by fabrication, e.g., as weldment parts and, in operation of the track, the shoes have ridden on top of the tire tread or have ridden on the flat surface of a smooth tire. There is a consequent disadvantage in the lack of positive engagement in the tire-to-track drive, and the weldment parts in each shoe do not all interact structurally because they are not integrated together in the design.

Our invention provides a skidder track shoe wherein the portions merge or blend together at the juncture in the shoe, resulting in a rigid, integral structure, preferably being a one piece, open-center casting. Due to the unity of design possible with casting, a close and optimum operating engagement is effected between protruding lugs provided on the pneumatic drive tire and the drive bars of the shoe, which latter ride stably and firmly seated in transverse grooves defined in the tire tread between adjacent lugs in that tread. Viewed the other way, the lugs are each stably and firmly seated in the open-center of a shoe because of projecting at least partway thereinto.

A specific object of the invention is the provision, in a positive drive, articulated, endless track assembly having a longitudinal axis, of an integral track shoe for use with a pneumatic, axle-driven tire provided with straight transverse grooves located in the tread thereof and having a uniform pitch spacing, the track shoe comprising two transversely-spaced-apart, stepped plates; crossbars therebetween, being spaced apart longitudinally from one another, the crossbars further being of a narrow wedge shape in cross section, having the apex of each wedge in tread-facing relation but arranged with the planes of the bars in non-parallel relation; and domed guides between the crossbars and each substantially normal to a different one of said plates, and depending from the tread facing side of such plate; the crossbars being integral with, and upon the same plate side with, and supported by the domed guides.

A more specific object, in line with the preceding objective, is the provision of a track shoe with two crossbars arranged as described, and with the planes of the crossbars, when extended, intersecting in a predetermined line to coincide with the drive-axle axis for the tire.

Further features, objects, and advantages will either be specifically pointed out or become apparent when, for a better understanding of the invention, reference is made to the following written description taken in conjunction with the accompanying drawings which show a preferred embodiment thereof, and in which:

FIGURE 1 is an outside plan view of a skidder track assembly trained over a tire;

FIGURE 2 is a side elevational view, partly in section, showing the skidder track assembly, in which alternate ones of the track shoes embody the present invention;

Figure 3:
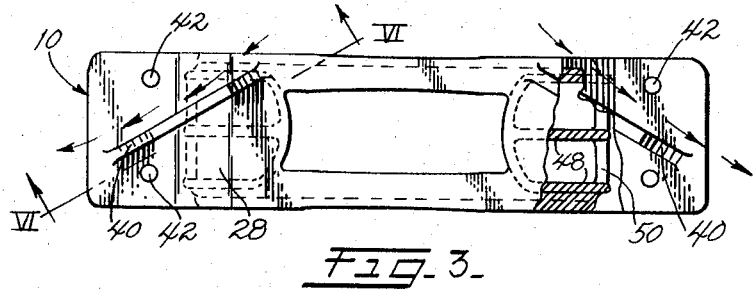
FIGURES 3 and 4 are outside plan and rear elevational views of a single shoe.

More particularly in FIGURES 1 and 2 of the drawings, a skidder track assembly is shown which includes articulately connected track shoes 10 and which is trained in an endless chain to pass over a series of tandem tires including an axle-driven pneumatic drive tire 12. Each shoe 10 comprises two side plates 14 disposed one at each side of the tread of the tire 12 and each having an outer face or side 16 for ground engagement and an inner side 18 facing the tread of the tire.

The drive tire 12 has a row of wide projecting lugs 20 defining intervening V-grooves 22 in the tread. The opposed faces of adjacent lugs 20 diverge in the radially outward direction so as to provide easy access to the grooves 22.

The plates 14 of the individual shoe are transversely spaced apart and have two crossbars 24 integral with, supported by, and holding the plates in the spaced apart relation. In the direction of track movement along the longitudinal axis 26, the crossbars 24 are spaced apart by a uniform chordal pitch CP precisely equal to the chordal pitch of the uniformly spaced grooves 22.

Each plate in a shoe has a longitudinally running step 28 integrally dividing the plate into a medial portion carrying an inwardly projecting, so-called tire guide 30 on the tread facing side of that portion, and an inwardly offset lateral portion 32. On the tread facing side of the lateral portion 32, a C-shaped link or bracket 34 is secured to the plate by means of connecting bolts 36. Each bracket 34 is coupled by means of a square-shaped link 38 to the adjacent link on one side and to the adjacent link on the opposite side.

Figure 5:
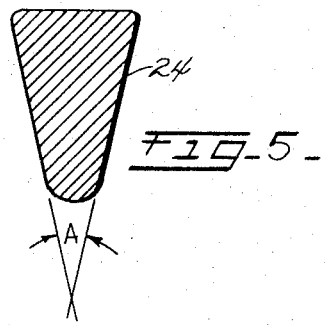
FIGURES 5, 6 and 7 are views of details, taken along the respective section lines V—V of FIGURE 4, section lines VI—VI of FIGURE 3, and section lines VII—VII of FIGURE 4.

In FIGURES 2 and 5, the crossbars 24 are, as viewed in cross section, of a narrow wedge shape with the apex of each wedge adapted to be socketed in the bottom of a receiving groove 22 in the tire tread. While the grooves 22 and the tire lugs 20 which are interfitted in the open-centers of the shoe are in general in parallel relation, and while the axes of the crossbars are in general in parallel relation, the planes of the crossbars on a shoe are non-parallel and converge toward a reference plane midway therebetween so that when extended, they intersect in a predetermined line 38 coinciding with the drive axle axis for the tire 12 The wedge angle A, FIGURE 5 of each crossbar was 24° in one physically constructed embodiment of the invention, and the angle at which the planes of adjacent crossbars converged (FIGURE 2) was 11°.

The step 28 in each plate 14 provides for longitudinal stiffening thereof, i.e., stiffening in the direction of the longitudinal axis 26 of travel. A generally transversely extending, diagonal grouser plate 40 which is integral with the ground-engaging face 16 of each side plate, provides of transverse stiffening of each plate. Primarily however, the grouser 40 is provided so as to penetrate the ground and furnish the requisite traction for the skidder. Each grouser 40 is self-cleaning in its action so that, under ground reaction as seen in FIGURE 3, the soil is wiped diagonally outwardly and rearwardly in the direction of the arrows appearing in FIGURE 3. Two holes 42 provided in each plate for reception of the connecting bolts 36, are disposed one on each side of the grouser, the grouser 40 crossing the step 28 in the central portion of the grouser.

Figure 4:
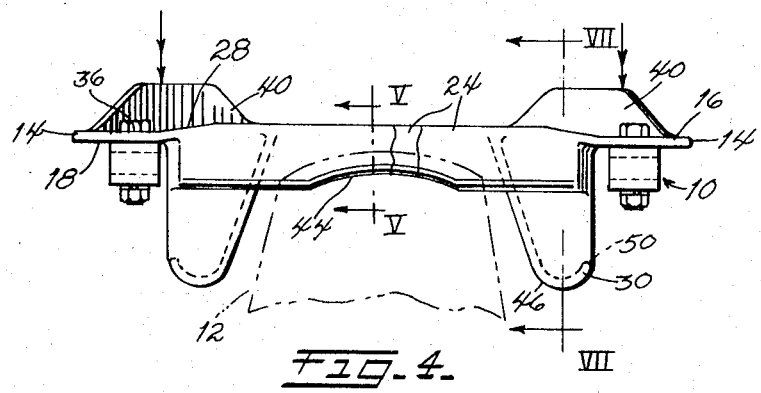

In FIGURE 4, the tire force at the centerline of tire 12 is radially outwardly directed, and is met by ground reaction tending to concentrate generally at the two laterally separated points indicated by double-headed arrows. The pressure at the extreme lateral edges of each shoe is reduced owing to the radial inward offset provided by presence of the step 28 in each plate. The crossbars 24, which serve the further function as drive bars for the track assembly, are arranged so that the thicker portion of their wedge section is on the beam tension side and their thinner apex portion or edge is under compression. Each crossbar 24 has a maximum depth of cross section adjacent the inner edges of the plates and extends uniformly for a distance in both directions. An arcuate relief portion 44 at the bar center section accommodates the peripheral crown of the tire 12.

The so-called tire guides 30 are actually tire-engaging guides which assist in keeping the track assembly running centered and true on the tandem wheels of the vehicle on which they are trained. Each guide 30 is integral at one side of the shoe with the tread facing, inner side 18 of the plate at that side and includes a dome 46. The dome has an opening 50 at the outer side and is reinforced by three internal ribs 48 which are equidistantly spaced apart and which are generally parallel with the crossbars.

Figure 7:
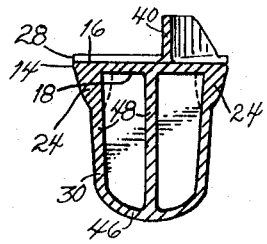
Figure 6:
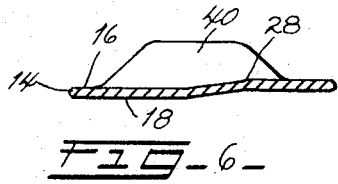

At each end, each crossbar 24 is squarely in end-to-end alignment with a portion of the same integral guide 30 with which the other crossbar is squarely end-to-end aligned (FIGURE 7), the crossbars bridging between said two domed guides and being integral with, and upon the same plate side with, and supported by the domed guides. The resulting smooth merger of the guide and two crossbars integrally with the underside of the adjacent side plate 14 provides an interacting construction which is remarkably free from cracking and which contributes to an exceptionally rigid structure. In one physically constructed embodiment of the invention the shoe was a one piece steel casting, type SC–1, specification E–2 material.

It is not essential that the track assembly be composed exclusively of the two bar shoes 10 each carrying tire guides 30. In practice, alternate ones of the shoes of a track, for example a thirty-seven shoe track, were two bar shoes (nineteen shoes), with each remaining shoe being a single bar shoe 10a (eighteen shoes). The connecting bolts 34 provided in the single bar shoe specially numbered 10a are readily seen in FIGURE 2, which discloses that the C-shaped brackets each have their free legs clamped directly to the adjacent side plate of the shoe. A single drive bar 52 is welded to the inner side of the side plates of the shoe 10a and a combined grouser and crossbar 54 is welded to the outer side of the shoe side plates. Tire guides on the single bar shoes 10a would not only be unnecessary if provided, but are deemed inadvisable because of the attendant expense.

While primarily adapted for use on a skidder vehicle of the type generally as shown in U.S. patent application Ser. No. 387,300, filed Aug. 4, 1964, and assigned to the assignee hereof, the track shoes of the present invention are equally adapted for use on other pneumatic tired, track laying vehicles.

What is claimed is:

1. In a positive drive, articulated, endless track assembly having a longitudinal axis, a unitary, two-bar, track shoe for use with pneumatic, track-driving tire provided with straight transverse grooves in the tread thereof having a uniform pitch spacing, said shoe comprising;
   two separate, transversely-spaced-apart, stepped plates;
   two drive bars connected in a crosswise deposition therebetween, being spaced apart along said longitudinal axis from one another; and
   domed guides each integrally depending substantially normal from a different one of said plates, upon a tread facing side thereof; said guides being hollow and including a plurality of internal and external ribs generally parallel with said crossbars and reinforcing the domes of said guides;
   each drive bar being upon the same plate side with, in end-to-end alignment with, and integrally bridging between the domed guides.

2. In a positive drive, articulated, endless track assembly having a longitudinal axis, an integral track shoe of a cast construction for use with a pneumatic, axle-driven tire provided with straight transverse grooves in the tread thereof having a uniform pitch spacing, said integral shoe comprising:
   two transversely-spaced-apart, stepped plates;
   two drive bars fixed crosswise therebetween, being spaced apart longitudinally from one another by a distance equal to said pitch spacing, said fixed bars being of a narrow wedge shape in cross section, having the apex of each wedge in tread facing relation and arranged with the planes of the bars in non-parallel relation;
   two domed guides each integrally depending substantially normal from a different one of said plates, upon the tread facing side of such plate;
   each of fixed bar being upon the same plate side with, in end-to-end alignment with, and integrally bridged to and between, the domed guides; and
   links connected to the plates of the shoe for articulately securing it to shoes different therefrom.

3. In axle-powered positive drive mechanism for an endless track assembly, the combination of:
   a unitary, ground-engaging shoe of integrally cast construction for supporting a tire so as to provide crawler traction; and
   a pneumatic, axle-driven tire for applying torque to the shoe and formed with transverse grooves in the tire tread having a uniform pitch spacing;
   said shoe comprising two plates disposed in transversely-spaced-apart relationship with one at each side of the tread of the tire; and
   two drive bars associated in positive drive engagement in successive grooves of the tread and being integral with, and supported by, and holding said plates in the spaced relation aforesaid, said drive bars being arranged, as viewed in cross section, with a narrow wedge shape, and with the apex of each wedge socketed in the bottom of the associated groove, there being a parallel relation, as among one another, of the straight through paths defined by the grooves and as among the axes of the drive bars to one another, but the planes of said bars being in non-parallel relation.

4. In axle-powered positive drive mechanism for an acticulated track assembly, the combination of:
   linked-together, ground-engaging track means comprising, among others, shoes of an individual integrally cast construction and effective for supporting a tire so as to provide crawler traction; and
   a pneumatic, axle-driven tire for applying torque to the shoes and formed with straight through, transverse grooves in the tire tread having a uniform pitch spacing;
   alternate ones of the shoes constructed with two plates disposed in transversely-spaced-apart relationship with one at each side of the tread of the tire; and further constructed with
   two drive bars associated in positive drive engagement in the grooves of the tire tread and being integral with, and supported by, and holding said plates in the spaced relation aforesaid;
   said drive bars being arranged, as viewed in cross section, with a narrow wedge shape, and with the apex of each wedge socketed in the bottom of the associated groove, there being a parallel relation as among the straight line paths through grooves with respect to one another, and as among the axes of the drive bars with respect to one another; the planes of said bars, when extended, intersecting in a line coincident with the drive-axle axis for the tire; each remaining one of the linked together shoes being of a construction of another type.

5. In axle-powered positive drive mechanism for an endless track assembly, the combination of:
   an integral, ground-engaging shoe of cast construction for supporting a tire so as to provide crawler traction;

a pneumatic, axle-driven tire for applying torque to the shoe and formed with straight transverse grooves in the tire tread having a uniform pitch spacing;

said shoe comprising two plates disposed in transversely-spaced-apart relationship with one at each side of the tread of the tire;

two crossbars in the shoe associated in positive drive engagement within successive grooves of the tire tread and being integral with, and supported by, and holding said plates in the spaced relation aforesaid;

said plates having medial and lateral portions and being cast with longitudinally extending, intervening, integral steps therein to offset the lateral and medial portions of each plate into different planes, the offset formed by said steps providing for longitudinal stiffening of each of the plates, and the integral cross bars providing for the transverse stiffening thereof;

said cross bars being arranged, as viewed in cross section with a narrow wedge shape, and with the apex of each wedge socketed in the bottom of the associated groove, there being a parallel relation as among the recesses of the grooves to one another, and as among the axes of the cross bars to one another, but the planes of the cross bars being in non-parallel relationship; and means on the plates for linking the shoe to other shoes in the endles track assembly.

6. In axle-powered positive drive mechanism for an endless track assembly, the combination of:

an integral, ground-engaging shoe for supporting a tire so as to provide crawler traction;

a pneumatic, axle-driven tire for applying torque to the shoe and formed with straight transverse grooves in the tire tread having a uniform pitch spacing;

said shoe comprising two plates disposed in transversely-spaced-apart relationship with one at each side of the tread of the tire;

two drive bars associated in positive drive engagement with longitudinally successive grooves of the tire tread and being integral with, and supported by, and holding said plates in the spaced relation aforesaid;

said plates having medial and lateral portions, and formed with an integral, generally longitudinally extending, intervening step to offset the lateral portion of each plate in a direction away from the ground with respect to the medial portion, causing the respective portions to occupy different planes, said step in each plate providing for longitudinal stiffening; and a diagonal, generally transversely-extending grouser rib carried by the ground-engaging side of each plate and providing for transverse stiffening;

said drive bars being arranged, as viewed in cross section, with a narrow wedge shape, and with the apex of each wedge socketed in the bottom of the associated groove, there being a parallel relation as among the axes of the grooves to one another, and as among the axes of the drive bars to one another, but with the planes of said bars being in non-parallel relation.

7. In an endless track assembly having a longitudinal axis, an integral track shoe for use with a pneumatic, track-driving tire provided with transverse grooves in the tread thereof having a uniform pitch spacing in the direction of said longitudinal axis, said integral shoe comprising:

two separate transversely-spaced-apart plates, said plates having medial and lateral portions formed with individual intervening steps to offset the lateral and medial portions of each plate into different parallel planes, each plate having a side adapted to face in the direction of the tread of the tire;

two drive bars connected in a crosswise disposition therebetween, the bars being spaced apart longitudinally from one another; and domed guides integrally depending with respect to a different one of said plates, from the tread-facing side thereof;

each drive bar being aligned end-to-end with two guides, and being integral with, and supported by said guides and plates.

8. For use in a drive-member-driven track assembly having a longitudinal direction of travel, a shoe of one piece, cast construction adapted to be engaged by the drive member and having:

transversely spaced apart plates, each provided with medial and lateral portions having a generally longitudinally extending intervening integral step to offset the lateral portion of each plate in a direction away from the ground with respect to the medial portion of that plate so that the two portions occupy spaced apart generally parallel planes, said plates having a ground engaging side and a tread facing side; and two drive bars between the plates, said drive bars being integral with, and supported by, the plates along the tread facing side thereor, said drive bars having maximum depth of cross section adjacent the medial edges of the plates and having minimal depth at an arcuately relieved portion provided at each bar center section to accommodate the peripheral crown of a drive member;

the offset formed by said step in each plate providing for longitudinal stiffening, said integral bars providing for transverse stiffening in each plate.

9. In a shoe adapted to be moved by a track drive member as part of a longitudinal, endless track assembly, and having a separated pair of side plates in transversely-spaced-apart relation and disposed one at each of the extreme opposite sides of the track, and joined by two drive bars therebetween, said track drive member having radial receiving grooves into which drive bars are adapted to fit for drive transmitting purposes, the improvement wherein:

the two drive bars serve to complementarily fit in radial, receiving grooves for the purposes described and are formed integral with, and supported by, and hold the plates in the spaced relation aforesaid, said drive bars having a narrow cross section of wedge shape, of which the wider end is substantially straight in length and constitutes the higher-loaded, tension side of the bars;

the planes of the bars converging with one another and with a reference plane, on the apex side of the bars so as to intersect on a common axis on that side of the bars, said reference plane constituting the midplane which is between the bars and transverse to the direction of said longitudinal movement;

each bar having a nonstraight compression side due to the latter being relieved in the center section of the bar length, along the arc of a circle in the plane of the bar, to accommodate the peripheral crown of the track drive member.

10. In a positive drive, articulated, endless track assembly having a longitudinal direction of movement, a one-piece, domed track shoe which is integrally cast for use with a pneumatic, track driving tire, said tire being provided in the tread with transverse grooves formed therein having a uniform pitch spacing, said integral shoe comprising:

two transversely spaced apart, essentially flat plates for disposition one at each side of the tread of the tire;

drive bars connected in a crosswise disposition therebetween, and being spaced apart in the longitudinal direction of movement by a distance conforming to said pitch spacing;

domed guides integrally depending from said plates upon that side thereof which is adapted to face in the direction of said tread;

each drive bar being upon the same plate side with, in end-to-end alignment with, and integrally bridged to and between, two guides; and a diagonally laterally extending grouser plate on each of the first said two plates.

11. In a positive drive, articulated, endless track assembly, an integral track shoe of a cast construction, for use with a pneumatic, track driving tire having a tire tread with straight transverse grooves formed therein, said grooves arranged with uniform pitch spacing in the direction of track motion, said integral shoe comprising:

two transversely spaced apart, stepped plates;

two drive bars connected in a crosswise disposition therebetween, being spaced apart from one another in the direction of track motion;

domed guides each integrally depending substantially normal from a different one of said plates, upon that side of such plate which faces the tread;

each drive bar being upon the same plate side with, in end-to-end alignment with, and integrally bridged to and between, the domed guides; and links connected to the plates of the shoe for articulately securing it to the other shoes.

12. In an endless track assembly having a longitudinal axis, a unitary track shoe of cast construction, for use with a pneumatic, track driving tire provided with straight transverse grooves in the tire tread having uniform spacing, said unitary shoe having;

two transversely spaced apart plates having a tread-facing side, and lateral and medial portions formed with an individual, integral intervening step effectively offsetting the lateral and medial portions therof into different planes;

crossbars between the plates, said crossbars being spaced apart longitudinally;

the offset formed by said step in each plate providing for longitudinal stiffening, said crossbars providing for transverse stiffening in each plate;

two domed guides each mounted upon a tread-facing side of a different one of said plates;

said crossbars being upon the same plate side with, in end-to-end alignment with, and bridging integrally between, the two guides; and means on the plates for linking the shoe to the other shoes having no guides.

References Cited

UNITED STATES PATENTS

| | | | |
|---|---|---|---|
| 1,633,259 | 6/1927 | Langenfeld. | |
| 2,273,950 | 2/1942 | Galanot | 305—38 X |
| 2,423,544 | 8/1947 | Acton | 305—56 |
| 2,999,723 | 9/1961 | Ostberg | 305—57 |
| 3,107,128 | 10/1963 | Ruane | 305—35 |

FOREIGN PATENTS

| | | |
|---|---|---|
| 873,678 | 7/1961 | Great Britain. |
| 93,942 | 5/1959 | Norway. |

RICHARD J. JOHNSON, *Primary Examiner.*

BENJAMIN HERSH, *Examiner.*